(12) United States Patent
Arora et al.

(10) Patent No.: US 6,524,398 B2
(45) Date of Patent: Feb. 25, 2003

(54) LOW-RESIDUE, LOW-SOLDER-BALL FLUX

(75) Inventors: Sanyogita Arora, North Arlington, NJ (US); Bin Mo, East Brunswick, NJ (US)

(73) Assignee: Fry's Metals, Inc., Jersey City, NJ (US)

( * ) Notice: Subject to any disclaimer, the term of this patent is extended or adjusted under 35 U.S.C. 154(b) by 6 days.

(21) Appl. No.: 09/834,196

(22) Filed: Apr. 12, 2001

(65) Prior Publication Data

US 2002/0017337 A1 Feb. 14, 2002

Related U.S. Application Data

(60) Provisional application No. 60/197,082, filed on Apr. 13, 2000.

(51) Int. Cl.$^7$ ................................................ B23K 35/34
(52) U.S. Cl. ........................................................ 148/23
(58) Field of Search ............................................ 148/23

(56) References Cited

U.S. PATENT DOCUMENTS

| | | | |
|---|---|---|---|
| 2,880,125 A | 3/1959 | Jordan et al. | 148/23 |
| 3,158,120 A | 11/1964 | Von Hessert | 113/110 |
| 3,734,791 A | 5/1973 | Poliak | 148/23 |
| 4,089,804 A | 5/1978 | Falk | 252/355 |
| 4,460,414 A | 7/1984 | Hwang | 148/23 |
| 5,297,721 A | 3/1994 | Schneider et al. | 228/180.1 |
| 5,571,340 A | 11/1996 | Schneider et al. | 148/23 |

OTHER PUBLICATIONS

Laura J. Turbini, "Fluxes and Cleaning," in *Printed Circuits Handbook* (Clyde F. Coombs ed., 4$^{th}$ ed., 1996).

*Primary Examiner*—Daniel J. Jenkins
(74) *Attorney, Agent, or Firm*—Mintz, Levin, Cohn, Ferris & Popeo, P.C.

(57) ABSTRACT

A soldering flux includes a solvent, an activator in the solvent, and cationic and nonionic surfactants. The soldering flux can be applied to a substrate, such as a printed circuit board before solder is applied.

18 Claims, No Drawings

LOW-RESIDUE, LOW-SOLDER-BALL FLUX

RELATED APPLICATION

This application claims the benefit of U.S. Provisional Patent Application Serial No. 60/197,082, filed Apr. 13, 2000, the entire teachings of which are incorporated herein by reference.

FIELD OF THE INVENTION

The present invention relates to soldering flux compositions useful in soldering applications for electronic assemblies such as printed wiring boards.

BACKGROUND OF THE INVENTION

The manufacture of printed circuit boards (PCBs), also referred to as printed wiring boards (PWBs), is typically divided into two processing categories, fabrication and assembly. Towards the end of the PCB fabrication process, after plating and etching, most of the PCB is covered with a solder mask. The solder mask is used to protect masked areas of the PCB from the attachment of solder. Accordingly, areas of the PCB that will later be soldered, such as the pads and holes, are not covered with the mask.

In a first step of the assembly process, both through-hole and surface mount components, such as integrated circuits, connectors, dual in-line packages, capacitors and resistors, are oriented with the PCB. For example, a component with leads may be mounted on the PCB by placing its leads through holes in the board. Surface mount components can be attached to the board's bottom side (i.e., the surface to be soldered) using adhesive. The components are then ready to be soldered to the PCB to ensure reliable electrical continuity between the components and PCB circuitry. The component leads and terminations or pads can be soldered via a wave solder process.

The wave solder process includes the steps of fluxing, preheating and soldering. In the fluxing step, a flux is used to prepare the surfaces to be soldered. Such preparation is generally needed because the PCB and the components can become contaminated as a consequence of having been stored in a non-clean-room environment before the soldering process. In addition, oxides may have formed on the leads, terminations and/or pads. In addition to reacting with or removing contaminants and oxides, the flux can perform other functions, such as protecting the surfaces from re-oxidation and reducing the interfacial surface tension between the solder and the substrate to enhance wetting.

Typically, a spray, foam or wave fluxing process is used to apply the flux onto the PCB and component surfaces to be soldered. The fluxing procedure is followed by a preheating step to evaporate the solvent carriers in the flux, such as alcohols or water, and to begin heating the surfaces to be joined. The preheat step is followed by a wave solder process in which the PCB, with components mounted thereon, is passed over a wave of molten solder. The solder wave is pumped through a nozzle; and the wave then contacts and deposits solder on the surface to be joined. The deposited solder then serves to bond and electrically connect the leads and terminations of the components with the contacts on the PCB.

Many of the existing low-solids, no-clean soldering fluxes cause an excessive number of solder balls to be left on the PCB surface. These fluxes also cause solder bridging because their surface tensions are too high. In addition, due to their weak activity levels, the fluxes are unable to thoroughly remove the tarnish and oxides from the surfaces to be joined. Solder balls are unwanted balls of solder occurring randomly or non-randomly on the solder mask and/or between the leads of the components on the board; the solder balls can bridge a gap between two conductors resulting in an electrical short. Solder bridges are connections of unwanted solder that can form a short circuit between two traces or leads that were not designed to be connected. Solder bridges and/or solder balls may cause electrical failure of the board. Excessive solder balls and bridging also require costly solder touch-up operations for their removal. Even tiny solder balls, often referred to as micro-solder balls, because they are only visible with magnification (e.g., 10 times magnification), can result in electrical shorting of very-closely-spaced board lines and pads as well as component leads and terminations. Another problem with existing fluxes is that they can leave visible residues on the surfaces of the PCB, which in addition to being unsightly, can cause false rejects with in-circuit pin testing.

Thus, a need exists for a soldering flux composition that effectively prepares the surfaces to be joined and that reduces the number of solder balls and solder bridges by reducing the surface tension between the PCB surfaces, component leads/terminations and molten solder without increasing the amount of visible residue.

SUMMARY

Described herein are fluxes offering reduced-micro-solder-balling, low-residue, low-solids, and no-clean capability. The fluxes include a solvent, an activator in the solvent, a cationic surfactant and a nonionic surfactant. The fluxes are particularly useful for coating a PCB prior to application of solder.

In one embodiment, the solvent is an alcohol, such as isopropyl alcohol. The cationic surfactant can be a quaternary ammonium fluoroalkyl surfactant. The nonionic surfactant can be a nonylphenoxypolyethoxyethanol surfactant. The activator can be a combination of a dicarboxylic acid and a nonionic brominated compound. A printed circuit board coated with a flux described herein includes a substrate on which conductive pathways and conductive contacts, typically formed of metal, are printed and electrically coupled. The flux is coated on the conductive contacts; then solder is applied onto the flux and the board. The solder provides electrical coupling between the contacts and components fixed to the PCB.

Fluxes described herein offer a variety of advantages. The fluxes can effectively remove metal oxides from the PCB surfaces to be soldered so as to promote solder wetting. The fluxes can also substantially lower the interfacial surface tension between the PCB surfaces and a molten solder alloy, thereby promoting drainage of excess solder from the board surface and consequently reducing solder-ball and solder-bridge formation. Moreover, the fluxes can reduce the amount of visible flux residue formed during the wave soldering process.

DETAILED DESCRIPTION

The soldering flux composition incorporates one or more cationic surfactants, one or more nonionic surfactants and activators dissolved in volatile solvent, such as isopropyl alcohol, ethyl alcohol, de-ionized water or mixtures thereof. Suitable concentration ranges (by weight percent) for these components in the flux composition are as follows: 50–98% solvent, 0.2–10% activator, 0.01–1.0% cationic surfactant, and 0.05–10% nonionic surfactant. In particular embodiments, the concentration range (by weight percent) for each of the above-mentioned components is as follows: 75–98% solvent, 0.2–5.0% activator, 0.05–0.5% cationic surfactant, and 0.10–2.0% nonionic surfactant. One or more high-boiling-point additives can also be incorporated into the flux composition, e.g., at a concentration of 0.2–25% by weight.

A cationic quaternary ammonium fluoroalkyl surfactant, such as FLUORAD FC-135 surfactant (manufactured by 3M Co. of St. Paul, Minn.), SURFLON S-121 surfactant (manufactured by Seimi Chemical Co., Japan), or Neos FTERGENT 300 surfactant (manufactured by Neos, Japan), is used to substantially reduce flux residues as well as the surface tension of the board surface and molten solder alloy. Consequently, the volume of random and non-random solder balls on the board surfaces is also reduced. Ammonium or amine fluoroalkyl surfactants that include an aromatic sulfone functional group (such as Neos FTERGENT 300 surfactant, which is a cationic quaternary ammonium fluoroalkyl compound with an aromatic sulfone functional group) have been found to be particularly effective.

Nonionic surfactants are added to further lower the surface tension of the composition and improve the high-temperature survivability of the flux to further reduce solder balling and bridging. The nonionic surfactant can resist decomposition on a boiling solder pot at a temperature of about 500° F. (260° C.). Suitable nonionic surfactants include, but are not limited to, nonylphenoxypolyethoxyethanols, Octylphenoxypolyethoxyethanols, alcohol ethoxylates, ethoxylated/propoxylated (EO–PO) copolymers, acetylinic diols, acetylinic diol ethoxylates, perfluoroalkyl ethylene oxides, perfluoroalkyl amine oxides and perfluoroalkyl carboxylates (e.g., S-141, S-145, S-111 & S-113, manufactured by Seimi Chemical Co., Japan).

While either the cationic or nonionic surfactant, by itself, can reduce the surface tension of the molten solder and metal surfaces to be joined, the combination of cationic and nonionic surfactants can produce unexpectedly positive results in terms of avoiding solder balling and solder bridging by dramatically lowering the surface tension of the molten solder and the surface energies of the metal surfaces to be joined, the solder mask on the PWB and the unmasked laminate. In particular, though the use of a nonionic surfactant can offer the desired high-temperature survivability, use of that nonionic surfactant, even at higher concentrations, is likely to still leave a substantial quantity of solder balls on the board surface. In contrast, a combined concentration of nonionic surfactant and cationic surfactant can produce a finished surface that is substantially free of solder balls and solder bridges—substantially more so than if an equivalent concentration of either nonionic surfactant or cationic surfactant is used in the absence of the other.

The combination of the cationic and nonionic surfactants creates a synergistic effect by lowering both the surface tension of the molten solder and the surface energies of the metal surfaces to be joined, the solder mask on the PWB and the unmasked laminate. Consequently, the amounts of micro-solder balls, bridges and flux residues are reduced to very-low levels.

The flux composition may also comprise various high-boiling-point additives, such as alcohols, glycol ethers and esters to enable the flux to survive the heat of the soldering process in special high-temperature soldering applications. The alcohols may be of various types; for example, aromatic and/or long-chain aliphatic alcohols and rosin alcohols can all be used. Specific examples include benzyl alcohol, tetradecanol and/or hydroabeityl alcohol. Additionally, rosin esters, such as methyl or glycerol or pentaerythritol ester of rosin, esters of modified rosins or resins, such as methyl ester of hydrogenated rosin, and/or other types of esters, such as methyl esters of carboxylic acids, can be included in the flux. Various glycol ether solvents, such as dipropylene glycol monomethyl ether or ethylene/propylene glycol phenyl ether, can also be included in the flux. Rosins, resins and waxes that can be incorporated into the flux include gum rosin, tall oil rosin, wood rosins, chemically-modified resins and rosins (such as hydrogenated rosins), polymerized rosins, fumaric/maleic adducts of rosins, phenolic resins and other natural and synthetic resins, rosins and waxes. These rosins, resins and waxes can be used, alone or mixed together, to enhance electrical reliability of the soldered PWBs.

The flux composition also includes an activator system, which may comprise one or more organic carboxylic acids, such as succinic, adipic, itaconic, malonic, oxalic or glutaric acids. Alternatively, or in addition, the flux can include nonionic, covalent-bonded organic halide activators, particularly bromide activators, such as trans-2,3-dibromo-2-butene-1,4-diol (DBD), styrene dibromide or dibromosuccinic acid. Bromide activators can be mono-, di- or tri-bromo carboxylic acids. The activators chemically remove oxides from the surfaces to be soldered.

The flux can additionally comprise various property-enhancing ingredients in small amounts, which do not materially affect the flux's basic fluxing properties. Such ingredients include, but are not limited to, corrosion inhibitors, dyes, foaming and/or defoaming agents, biocides and stabilizers. The use of such property-enhancing ingredients is well understood by those skilled in the art of flux formulating.

After the leads or terminations of a component are placed and positioned on a PCB (for example, by feeding the leads through plated or non-plated through-holes in the PCB), the flux can be applied to the leads and contacts by spray, foam, wave or other known methods. An air knife may then be used to remove excess flux, if necessary. After the flux is applied, the board is heated to volatilize the solvent; then the board typically is wave soldered by passing it over a molten solder wave. The wave soldering process deposits solder on the leads and contacts and the solder serves to bond and electrically connect the components to the board.

Flux compositions of the present invention can substantially ensure that the surface tension of the board and the molten solder is lowered during wave soldering so that solder does not form undesirable solder balls and/or bridges on the solder mask and in-between the component leads on the board. Furthermore, cleaning of residual flux from the PCB can be omitted such that the PCB can be used in an electronic application with tiny traces of flux residues remaining on the PCB.

Additional flux components and features, as well as additional methods involving the fluxes and methods described herein, are provided in L. Turbini, "Fluxes and Cleaning," *Printed Circuits Handbook*, 4$^{th}$ Ed., chapter 31 (1996), the teachings of which are incorporated herein by reference in their entirety.

EXEMPLIFICATION

Embodiments of the flux are further illustrated in the following example compositions. It should be understood, however, that although these descriptions particularly describe specific embodiments of the invention, the examples are primarily for purposes of illustration, and the invention, in its broader aspects, is not to be construed as limited thereto.

EXAMPLE 1

| Ingredient | % By Weight | Function |
|---|---|---|
| Isopropyl Alcohol | 93.00 | Solvent |
| Succinic Acid | 1.40 | Activator |
| Adipic Acid | 0.20 | Activator |
| TRITON N-101 Nonylphenoxypolyethoxyethanol | 0.20 | Nonionic surfactant |
| ABITOL E Hydroabeityl Alcohol | 0.30 | High (boiler) temperature survivor |
| FLUORAD FC-135 Fluorosurfactant | 0.40 | Cationic surfactant |
| Dipropylene Glycol Monomethyl Ether | 4.50 | Solvent |

EXAMPLE 2

| Ingredient | % By Weight | Function |
|---|---|---|
| Isopropyl Alcohol | 93.00 | Solvent |
| Adipic Acid | 0.20 | Activator |
| Succinic Acid | 1.40 | Activator |
| ABITOL E Hydroabeityl Alcohol | 0.30 | High (boiler) temperature survivor |
| TERGITOL NP-15 Nonylphenoxypolyethoxyethanol | 0.20 | Nonionic surfactant |
| FLUORAD FC-135 Fluorosurfactant | 0.40 | Cationic surfactant |
| Dipropylene Glycol Monomethyl Ether | 4.50 | Solvent |

EXAMPLE 3

| Ingredient | % By Weight | Function |
|---|---|---|
| Isopropyl Alcohol | 93.00 | Solvent |
| Adipic Acid | 0.20 | Activator |
| Succinic Acid | 1.40 | Activator |
| ABITOL E Hydroabeityl Alcohol | 0.30 | High (boiler) temperature survivor |
| TERGITOL NP-15 Nonylphenoxypolyethoxyethanol | 0.10 | Nonionic surfactant |
| TRITON N-101 Nonylphenoxypolyethoxyethanol | 0.10 | Nonionic surfactant |
| FLUORAD FC-135 Fluorosurfactant | 0.40 | Cationic surfactant |
| Dipropylene Glycol Monomethyl Ether | 4.50 | Solvent |

EXAMPLE 4

| Ingredient | % By Weight | Function |
|---|---|---|
| Isopropyl Alcohol | 90.72 | Solvent |
| Succinic Acid | 0.60 | Activator |
| Malonic Acid | 0.40 | Activator |
| Glutaric Acid | 0.20 | Activator |
| Dibromobutene Diol | 0.50 | Activator |
| Propylene Glycol Phenyl Ether | 5.00 | Solvent |
| Benzyl Alcohol | 2.00 | Solvent |
| TRITON N-101 Nonylphenoxypolyethoxyethanol | 0.30 | Nonionic surfactant |
| Benzotriazole | 0.08 | Corrosion inhibitor |
| FTERGENT 300 Fluorosurfactant | 0.20 | Cationic surfactant |

EXAMPLE 5

| Ingredient | % By Weight | Function |
|---|---|---|
| Isopropyl Alcohol | 93.00 | Solvent |
| Succinic Acid | 1.40 | Activator |
| Adipic Acid | 0.20 | Activator |
| TRITON N-101 Nonylphenoxypolyethoxyethanol | 0.20 | Nonionic surfactant |
| ABALYN Methyl Ester of Rosin | 0.30 | High (boiler) temperature survivor |
| FLUORAD FC-135 Fluorosurfactant | 0.40 | Cationic surfactant |
| Dipropylene Glycol Monomethyl Ether | 4.50 | Solvent |

EXAMPLE 6

| Ingredient | % By Weight | Function |
|---|---|---|
| Isopropyl Alcohol | 93.00 | Solvent |
| Succinic Acid | 1.40 | Activator |
| Adipic Acid | 0.20 | Activator |
| TRITON N-101 Nonylphenoxypolyethoxyethanol | 0.10 | Nonionic surfactant |
| TERGITOL NP-15 | 0.10 | Nonionic surfactant |
| HERCOLYN D Methyl Ester of Hydrogenated Rosin | 0.30 | High (boiler) temperature survivor |
| FLUORAD FC-135 Fluorosurfactant | 0.40 | Cationic surfactant |
| Dipropylene Glycol Monomethyl Ether | 4.50 | Solvent |

EXAMPLE 7

| Ingredient | % By Weight | Function |
|---|---|---|
| Isopropyl Alcohol | 93.00 | Solvent |
| Succinic Acid | 1.40 | Activator |
| Adipic Acid | 0.20 | Activator |
| TRITON N-101 Nonylphenoxypolyethoxyethanol | 0.10 | Nonionic surfactant |
| TERGITOL NP-15 Nonylphenoxypolyethoxyethanol | 0.10 | Nonionic surfactant |
| ABALYN Methyl Ester of Rosin | 0.30 | High temperature survivor |
| FLUORAD FC-135 Fluorosurfactant | 0.40 | Cationic surfactant |
| Tetrahydrofurfuryl Alcohol | 4.50 | Solvent |

EXAMPLE 8

| Ingredient | % By Weight | Function |
|---|---|---|
| Isopropyl Alcohol | 92.50 | Solvent |
| Succinic Acid | 1.40 | Activator |
| Adipic Acid | 0.20 | Activator |
| TRITON N-101 Nonylphenoxypolyethoxyethanol | 0.10 | Nonionic surfactant |
| TERGITOL NP-15 Nonylphenoxypolyethoxyethanol | 0.10 | Nonionic surfactant |
| ABALYN Methyl Ester Rosin | 0.30 | High (boiler) temperature survivor |
| Tetradecanol | 0.50 | High-boiling-point solvent |
| SURFLON 5-121 Fluorosurfactant | 0.40 | Cationic surfactant |
| Dipropylene Glycol Monomethyl Ether | 4.50 | Solvent |

EXAMPLE 9

| Ingredient | % By Weight | Function |
|---|---|---|
| Isopropyl Alcohol | 90.825 | Solvent |
| Succinic Acid | 0.600 | Activator |
| Malonic Acid | 0.400 | Activator |
| Glutaric Acid | 0.200 | Activator |
| Dibromobutene Diol | 0.500 | Activator |
| Propylene Glycol Phenyl Ether | 5.000 | Solvent |
| TRITON N-101 Nonylphenoxypolyethoxyethanol | 0.300 | Nonionic surfactant |
| Tetradecanol | 2.000 | High-boiling-point solvent |
| Benzotriazole | 0.075 | Corrosion inhibitor |
| FTERGENT 300 Fluorosurfactant | 0.100 | Cationic surfactant |

EXAMPLE 10

| Ingredient | % By Weight | Function |
|---|---|---|
| Isopropyl Alcohol | 97.65 | Solvent |
| Succinic Acid | 1.40 | Activator |
| DBD | 0.40 | Activator |
| TRITON N-101 Nonylphenoxypolyethoxyethanol | 0.20 | Nonionic surfactant |
| ABITOL B Hydroabeityl Alcohol | 0.30 | High (boiler) temperature survivor |
| FTERGENT 300 Fluorosurfactant | 0.05 | Cationic surfactant |

EXAMPLE 11

| Ingredient | % By Weight | Function |
|---|---|---|
| Ethyl Alcohol | 97.55 | Solvent |
| Succinic Acid | 1.80 | Activator |
| trans-2,3-Didromo-2-butene-1,4-diol (DBD) | 0.40 | Activator |
| TERGITOL NP-15 Nonylphenoxypolyethoxyethanol | 0.20 | Nonionic surfactant |
| FTERGENT 300 Fluorosurfactant | 0.05 | Cationic surfactant |

EXAMPLE 12

| Ingredient | % By Weight | Function |
|---|---|---|
| Water, De-ionized | 97.55 | Solvent |
| Succinic Acid | 1.80 | Activator |
| DBD | 0.40 | Activator |
| TRITON N-101 Nonylphenoxypolyethoxyethanol | 0.20 | Nonionic surfactant |
| FTERGENT 300 Fluorosurfactant | 0.05 | Cationic surfactant |

EXAMPLE 13

| Ingredient | % By Weight | Function |
|---|---|---|
| Isopropyl Alcohol | 50.00 | Solvent |
| Ethyl Alcohol | 47.50 | Solvent |
| Succinic Acid | 1.80 | Activator |
| Dibromosuccinic Acid | 0.40 | Activator |
| TRITON N-101 Nonylphenoxypolyethoxyethanol | 0.20 | Nonionic surfactant |
| FTERGENT 300 Fluorosurfactant | 0.05 | Cationic surfactant |
| Hydroxybenzotriazole | 0.05 | Corrosion inhibitor |

EXAMPLE 14

| Ingredient | % By Weight | Function |
|---|---|---|
| Isopropyl Alcohol | 38.77 | Solvent |
| Ethyl Alcohol | 38.78 | |
| Water, De-ionized | 20.00 | Activator |
| Succinic Acid | 1.80 | Activator |
| DBD | 0.40 | High temperature survivor |
| TRITON N-101 Nonylphenoxypolyethoxyethanol | 0.20 | Nonionic surfactant |
| FTERGENT 300 Fluorosurfactant | 0.05 | Cationic surfactant |

EXAMPLE 15

| Ingredient | % By Weight | Function |
|---|---|---|
| Isopropyl Alcohol | 97.55 | Solvent |
| Succinic Acid | 1.40 | Activator |
| Adipic Acid | 0.40 | Activator |
| DBD | 0.40 | Activator |
| TRITON X-100 Octylphenolethoxylate | 0.20 | Nonionic surfactant |
| FTERGENT 300 Fluorosurfactant | 0.05 | Cationic surfactant |

EXAMPLE 16

| Ingredient | % By Weight | Function |
|---|---|---|
| Water, De-ionized | 97.35 | Solvent |
| Succinic Acid | 1.80 | Activator |
| DBD | 0.40 | Activator |
| TRITON N-101 Nonylphenoxypolyethoxyethanol | 0.20 | Nonionic surfactant |
| SURFLON S-121 Perfluoroalkyl Trimethyl Ammonium salt | 0.20 | Cationic surfactant |
| FTERGENT 300 Fluorosurfactant | 0.05 | Cationic surfactant |

EXAMPLE 17

| Ingredient | % By Weight | Function |
|---|---|---|
| Water, De-ionized | 97.35 | Solvent |
| Succinic Acid | 1.40 | Activator |
| Adipic Acid | 0.40 | Activator |
| DBD | 0.40 | Activator |
| TRITON N-101 Nonylphenoxypolyethoxyethanol | 0.20 | Nonionic surfactant |
| SURFLON S-141 Perfluoroalkyl Amine Oxide | 0.20 | Nonionic Fluorosurfactant |
| FTERGENT 300 Fluorosurfactant | 0.05 | Cationic surfactant |

EXAMPLE 18

| Ingredient | % By Weight | Function |
|---|---|---|
| Isopropyl Alcohol | 97.25 | Solvent |
| Succinic Acid | 1.40 | Activator |
| Glutaric Acid | 0.20 | Activator |
| Adipic Acid | 0.20 | Activator |
| DBD | 0.40 | Activator |
| ABITOL E Hydroabeityl alcohol | 0.30 | High (boiler) temperature survivor |
| TRITON N-101 Nonylphenoxypolyethoxyethanol | 0.10 | Nonionic ethoxylated surfactant |
| TERGITOL NP-15 Nonylphenoxypolyethoxyethanol | 0.10 | Nonionic ethoxylated surfactant |
| FTERGENT 300 Fluorosurfactant | 0.05 | Cationic Fluorosurfactant |

EXAMPLE 19

| Ingredient | % By Weight | Function |
|---|---|---|
| Isopropyl Alcohol | 97.25 | Solvent |
| Succinic Acid | 1.80 | Activator |
| DBD | 0.40 | Activator |
| HERCOLYN D Methyl ester of Hydrogenated Rosin | 0.30 | High (boiler) temperature survivor |
| TRITON N-101 Nonylphenoxypolyethoxyethanol | 0.20 | Nonionic surfactant |
| FTERGENT 300 Fluorosurfactant | 0.05 | Cationic surfactant |

EXAMPLE 20

| Ingredient | % By Weight | Function |
|---|---|---|
| Isopropyl Alcohol | 97.25 | Solvent |
| Succinic Acid | 1.80 | Activator |
| Dibromobutene Diol | 0.40 | Activator |
| ABALYN Methyl Ester of Rosin | 0.30 | High (boiler) temperature survivor |
| TRITON N-101 Nonylphenoxypolyethoxyethanol | 0.20 | Nonionic surfactant |
| FTERGENT 300 Fluorosurfactant | 0.05 | Cationic surfactant |

EXAMPLE 21

| Ingredient | % By Weight | Function |
|---|---|---|
| Isopropyl Alcohol | 97.05 | Solvent |
| Succinic Acid | 1.80 | Activator |
| Dibromobutene Diol | 0.40 | Activator |
| POLYPALE Resin (hydrogenated gum rosin) | 0.50 | Film former, Reliability enhancer |
| TRITON N-101 Nonylphenoxypolyethoxyethanol | 0.20 | Nonionic surfactant |
| FTERGENT 300 Fluorosurfactant | 0.05 | Cationic surfactant |

EXAMPLE 22

| Ingredient | % By Weight | Function |
|---|---|---|
| Isopropyl Alcohol | 96.55 | Solvent |
| Succinic Acid | 1.80 | Activator |
| DBD | 0.40 | Activator |
| Gum Rosin | 1.00 | Film former, Reliability enhancer |
| TRITON N-10l or NP 15 Nonylphenoxypolyethoxyethanol | 0.20 | Nonionic ethoxylated surfactant |
| FTERGENT 300 Fluorosurfactant | 0.05 | Cationic surfactant |

EXAMPLE 23

| Ingredient | % By Weight | Function |
|---|---|---|
| Isopropyl Alcohol | 97.05 | Solvent |
| Succinic Acid | 1.80 | Activator |
| DBD | 0.40 | Activator |
| DYMEREX Dimerized Rosin | 0.50 | Film former, Reliability enhancer |
| TRITON N-101 Nonylphenoxypolyethoxyethanol | 0.20 | Nonionic ethoxylated surfactant |
| FTERGENT 300 Fluorosurfactant | 0.05 | Cationic surfactant |

EXAMPLE 24

| Ingredient | % By Weight | Function |
|---|---|---|
| Isopropyl Alcohol | 97.05 | Solvent |
| Succinic Acid | 1.80 | Activator |
| DBD | 0.40 | Activator |
| UNI-REZ 8200 Fumaric Modified Rosin | 0.50 | Film former, Reliability enhancer |
| TRITON N-101 Nonylphenoxypolyethoxyethanol | 0.20 | Nonionic ethoxylated surfactant |
| FTERGENT 300 Fluorosurfactant | 0.05 | Cationic surfactant |

The table, below, describes each of the trademarked chemicals, used in the Examples, above:

| Trademark | Composition | Manufacturer |
|---|---|---|
| TRITON N-101 & TERGITOL NP-15 | Nonylphenolethoxylate, 100% active | Union Carbide Corp. (Danbury, Connecticut, USA) |
| TRITON X-100 | Octylphenolethoxylate, 100% active | Union Carbide Corp. (Danbury, Connecticut, USA) |
| FLUORAD FC-135 | Cationic quatemary ammonium fluoroalkyl surfactant | 3M Co. (St. Paul, Minnesota, USA) |
| FTERGENT 300 | Cationic quatemary ammonium fluoroalkyl surfactant | Neos Co. Ltd. (Kobe, Hyogo, Japan) |
| SURFLON S-121 | Perfluoroalkyl Trimethyl ammonium salt, 30% active | Seimi Chemical Co. (Chigasaki, Kanagawa, Japan). |
| SURFLON S-141 | Perfluoroalkyl amine oxide, 30% active | Seimi Chemical Co., Japan. (Chigasaki, Kanagawa, Japan). |
| ABITOL E | Hydroabeityl alcohol | Hercules, Inc. (Wilmington, Delaware, USA) |
| ABALYN | Methyl ester of rosin | Hercules, Inc. (Wilmington, Delaware, USA) |
| HERCOLYN D | Hydrogenated Methyl Ester of Rosin | Hercules, Inc. (Wilmington, Delaware, USA) |
| POLYPALE Resin | Hydrogenated Gum Rosin | Hercules, Inc. (Wilmington, Delaware, USA) |
| DYMEREX | Rosin derived dimer acids | Hercules, Inc. (Wilmington, Delaware, USA) |
| UNI-REZ 8200 | Fumaric modified Rosin | Arizona Chemical (Jacksonville, Florida, USA) |

While this invention has been particularly shown and described with references to embodiments thereof, those skilled in the art will understand that various changes in form and details may be made therein without departing from the scope of the invention, which is limited only by the following claims.

What is claimed is:

1. A soldering flux comprising:
   a solvent;
   an activator in the solvent; and
   a cationic surfactant in the solvent, the surfactant selected from the group consisting of cationic quaternary ammonium fluoroalkyl compounds and cationic fluoroalkyl amine compounds.

2. The soldering flux of claim 1, wherein the cationic surfactant includes an aromatic sulfone functional group.

3. The soldering flux of claim 1, further comprising a high-boiling-point additive selected from the group consisting of glycol ether solvents, aromatic alcohols, long-chain aliphatic alcohols, rosin alcohols, methyl esters of carboxylic acids, rosin esters, and esters of modified rosins and resins.

4. The soldering flux of claim 1, wherein the solvent includes an alcohol.

5. The soldering flux of claim 1, wherein the solvent includes water.

6. The soldering flux of claim 1, wherein the activator includes a carboxylic acid.

7. The soldering flux of claim 6, wherein the carboxylic acid activator includes at least one activator selected from the group consisting of succinic acid, adipic acid, glutaric acid, itaconic acid, oxalic acid and malonic acid.

8. A soldering flux comprising:
   a solvent;
   an activator that includes a nonionic covalently-bonded bromide compound in the solvent;
   a cationic surfactant in the solvent; and
   a nonionic surfactant in the solvent.

9. The soldering flux of claim 8, wherein the nonionic covalently-bonded bromide compound includes at least one member selected from the group consisting of trans-2,3-dibromo-1-butene-1,4 diol; dibromo styrene; and mono-, di- and tri-bromo carboxylic acids.

10. The soldering flux of claim 1, additionally comprising at least one rosin, resin or wax selected from the group consisting of natural rosins, resins and waxes; chemically-modified rosins, resins and waxes; synthetic resins and waxes; and mixtures thereof.

11. The soldering flux of claim 1, further comprising a nonionic surfactant in the solvent.

12. The soldering flux of claim 11, wherein the nonionic surfactant includes at least one surfactant selected from the group consisting of ethoxylated surfactants, ethoxylated/propoxylated copolymer surfactants, and fluorosurfactants.

13. The soldering flux of claim 1, wherein the cationic surfactant includes at least one surfactant selected from the group consisting of quaternary ammonium fluoroalkyl compounds and cationic fluoroalkyl amine compounds.

14. The soldering flux of claim 1, wherein the soldering flux is free of components that, when applied to a printed circuit board, would impair the functionality and electrical reliability of a printed circuit board if soldering flux residue is not removed prior to operation of the printed circuit board.

15. The soldering flux of claim 14, wherein the flux can substantially reduce formation of solder balls on a printed circuit board when the flux is applied to the printed circuit board and the printed circuit board is then passed over a molten solder wave.

16. The soldering flux of claim 1, wherein the activator and cationic surfactant are distinct compounds, and the cationic surfactant lacks substantial activation properties at the concentration level at which it is present.

17. The soldering flux of claim 1, wherein the activator includes a nonionic covalently-bonded bromide compound.

18. The soldering flux of claim 17, wherein the nonionic covalently-bonded bromide compound includes at least one member selected from the group consisting of trans-2,3-dibromo-1-butene-1,4 diol; dibromo styrene; and mono-, di- and tri-bromo carboxylic acids.

* * * * *